United States Patent

Elsman

[11] Patent Number: 6,029,102
[45] Date of Patent: Feb. 22, 2000

[54] DRIVER CONTROL DISPLAY SYSTEM FOR A VEHICLE

[76] Inventor: James L. Elsman, 4811 Burnley Dr., Bloomfield Township, Mich. 48304

[21] Appl. No.: 09/108,356

[22] Filed: Jul. 1, 1998

Related U.S. Application Data

[60] Provisional application No. 60/051,462, Jul. 1, 1997.

[51] Int. Cl.⁷ .................................................. B60R 25/10
[52] U.S. Cl. ................................................. 701/1; 340/468
[58] Field of Search .......................... 701/1, 36; 340/468, 340/425.5, 426, 466, 465, 576; 307/9.1, 10.1, 10.3, 10.5; 180/272; 40/592

[56] References Cited

U.S. PATENT DOCUMENTS

| | | | |
|---|---|---|---|
| 3,634,880 | 1/1972 | Hawkins | 340/63 |
| 3,665,397 | 5/1972 | Di Napoli et al. | 340/147 R |
| 3,755,776 | 8/1973 | Kotras | 340/53 |
| 3,803,551 | 4/1974 | Jordan | 340/64 |
| 3,824,538 | 7/1974 | Slemp | 340/53 |
| 3,839,701 | 10/1974 | Pomerantz | 340/52 F |
| 3,860,905 | 1/1975 | Guerini | 340/62 |
| 3,863,205 | 1/1975 | Chun-Chih | 340/32 |
| 3,878,915 | 4/1975 | Purland et al. | 180/105 E |
| 3,913,086 | 10/1975 | Adler et al. | 340/279 |
| 4,007,438 | 2/1977 | Protonantis | 340/62 |
| 4,016,534 | 4/1977 | Kobayashi et al. | 340/52 F |
| 4,045,794 | 8/1977 | Ohta | 340/414 |
| 4,067,411 | 1/1978 | Conley et al. | 180/114 |
| 4,093,945 | 6/1978 | Collier et al. | 340/279 |
| 4,177,466 | 12/1979 | Reagan | 343/112 TC |
| 4,186,376 | 1/1980 | Uchida | 340/52 F |
| 4,255,739 | 3/1981 | Lang | 340/52 F |
| 4,463,340 | 7/1984 | Adkins et al. | 340/64 |
| 4,553,511 | 11/1985 | Hayakawa et al. | 123/179 B |
| 4,591,823 | 5/1986 | Horvat | 340/53 |
| 4,738,333 | 4/1988 | Collier et al. | 180/272 |
| 4,763,234 | 8/1988 | Scott | 362/293 |
| 4,777,377 | 10/1988 | Jeter | 307/10 AT |
| 4,804,937 | 2/1989 | Barbiaux et al. | 340/52 F |
| 4,805,722 | 2/1989 | Keating et al. | 180/287 |
| 4,831,372 | 5/1989 | Riddoch | 340/788 |

(List continued on next page.)

FOREIGN PATENT DOCUMENTS

| | | |
|---|---|---|
| 131 211 | 1/1985 | European Pat. Off. . |
| 3329783 | 2/1985 | Germany . |
| 4431190 | 3/1996 | Germany . |
| 2 299 796 | 10/1996 | United Kingdom . |

OTHER PUBLICATIONS

"Alcohol Related Driver's License Suspension–Five Concepts to Consider Before Restoration", Judge William J. Caprathe, *Michigan Bar Journal*, Mar. 1997, pp. 282–286.

*Primary Examiner*—Michael J. Zanelli
*Attorney, Agent, or Firm*—Gifford, Krass, Groh, Sprinkle, Anderson & Citkowski, P.C.

[57] ABSTRACT

A driver control display system for a vehicle includes a driver identifier, a display and a controller. The display is supported by the vehicle and selectively displays a message that can be viewed from the outside of the vehicle. The controller is in communication with the driver identifier and with the display and includes the restriction checker. The restriction checker determines if the driver of the vehicle is violating a restriction and, if so, causes the display to display the message. The driver identifier may be a keycard receiver that accepts keycards containing driver identifying information.

5 Claims, 2 Drawing Sheets

U.S. PATENT DOCUMENTS

| | | | |
|---|---|---|---|
| 4,843,377 | 6/1989 | Fuller et al. | 340/573 |
| 4,885,571 | 12/1989 | Pauley et al. | 340/573 |
| 4,894,641 | 1/1990 | Yang | 340/466 |
| 4,916,584 | 4/1990 | Gustafson | 362/61 |
| 4,918,432 | 4/1990 | Pauley et al. | 340/573 |
| 4,926,332 | 5/1990 | Komuro et al. | 364/424.05 |
| 4,952,913 | 8/1990 | Pauley et al. | 340/573 |
| 4,982,072 | 1/1991 | Takigami | 235/384 |
| 4,990,890 | 2/1991 | Newby | 340/539 |
| 4,993,068 | 2/1991 | Piosenka et al. | 380/23 |
| 4,995,086 | 2/1991 | Lilley et al. | 382/4 |
| 5,010,319 | 4/1991 | Killinger | 340/472 |
| 5,023,605 | 6/1991 | McColl | 340/825.31 |
| 5,089,762 | 2/1992 | Sloan | 320/13 |
| 5,124,920 | 6/1992 | Tamada et al. | 364/424.05 |
| 5,255,306 | 10/1993 | Melton et al. | 379/38 |
| 5,307,048 | 4/1994 | Sonders | 340/426 |
| 5,365,516 | 11/1994 | Jandrell | 370/18 |
| 5,396,215 | 3/1995 | Hinkle | 340/426 |
| 5,519,260 | 5/1996 | Washington | 307/10.5 |
| 5,526,357 | 6/1996 | Jandrell | 370/95.2 |
| 5,554,970 | 9/1996 | Mottahedeh | 340/441 |
| 5,594,424 | 1/1997 | Louy et al. | 340/815.54 |

DRIVER CONTROL DISPLAY SYSTEM FOR A VEHICLE

RELATED APPLICATION

This application claims the benefit of U.S. Provisional Application No. 60/051,462 filed Jul. 1, 1997.

FIELD OF THE INVENTION

This invention relates to an automotive vehicle equipped with a display system that is visible to persons outside of the vehicle and to a control system for the display which generates warning messages when the driver of the vehicle is violating restrictions on the drivers license or authorization to use the vehicle.

BACKGROUND OF THE INVENTION

Courts of ten penalize violators of driving laws by placing restrictions on their licenses to drive. The judgment may withdraw the license for a particular period of time or restrict the hours in which the violator may drive to allow driving for business purposes but prevent driving during non-business hours. Similarly, the owner of the vehicle may choose to authorize its use by others only under limited conditions. For example, a parent may choose to authorize a son or daughter to only use the vehicle during school hours or an employer may choose to authorize an employee to use a vehicle only during business hours.

Violation of the judicially imposed restrictions generally only come to light when the driver with a restricted or suspended license is stopped by police for some driving offense. Violations of restrictions imposed by a vehicle owner on a limited authorization driver are even more difficult to detect since they do not appear on the driver's license.

The present invention is accordingly directed to a system which will enhance the efficacy of such driving restrictions by warning observers of the vehicle when the restrictions are being violated, yet will allow the continued use of the vehicle in violation of the restrictions for emergency purposes and the like.

SUMMARY OF THE INVENTION

The present invention is directed toward a vehicle equipped with a controlled display mounted on the vehicle so as to be visible to persons external to the vehicle such as other drivers, pedestrians, and in particular law enforcement officers. The display operates under supervision of a controller disposed on the vehicle which may control merely the energization of the display or may control the message shown on the display. The controller is also connected to the ignition system of the vehicle. In order to operate a vehicle equipped with the controller and display system, it is necessary to insert an authorizing card or other form of key into the controller. The card or key will be encoded with any restrictions that have been imposed on the driver. Entry of the authorization card will allow the vehicle to be started and operated, but if any restrictions are being violated, an appropriate display will be generated. In order to determine whether time based restrictions are being violated, the controller will include a real time clock.

The authorization card may be generated by law enforcement authorities or the owner of the vehicle. In one embodiment of the invention, the owner may encode restricted authorization cards using the controller by first entering an appropriate password.

In an alternative embodiment of the invention, the external display may be controlled to show information in addition to any violation of authorization restrictions such as speed of the vehicle, the mode of operation of the vehicle such as "slowing" or "stopping" and the like.

BRIEF DESCRIPTION OF THE DRAWINGS

Other objects, advantages and applications of the invention will be made apparent by the following detailed description of preferred embodiments of the invention. The description makes reference to the accompanying drawings in which.

DETAILED DESCRIPTION OF PREFERRED EMBODIMENTS OF THE INVENTION

Figure 1:
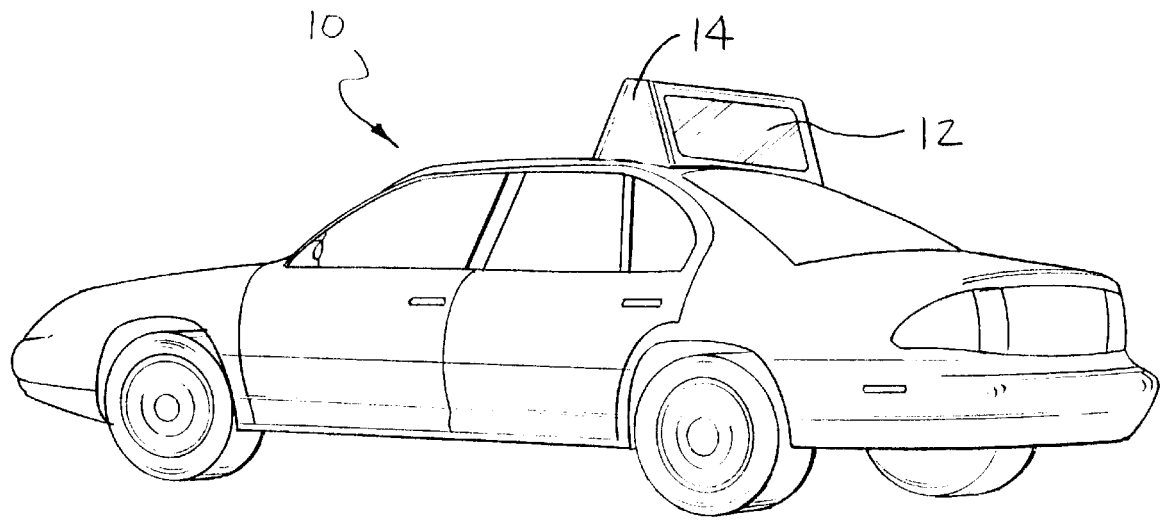
FIG. 1 is a perspective view of an automobile having a display panel formed in accordance with the present invention attached to the rear of its roof so as to be visible to persons external of the vehicle.

The system of the present invention is adapted to be installed on vehicles such as the automobile 10 illustrated in FIG. 1, or trucks, motorcycles or the like. A display screen 12 is affixed to the rear of the roof of the vehicle and is supported in a frame 14. The display screen may be of any type suitable for the display of alphanumeric messages in large enough letters and numbers so that they may be read at a distance from the vehicle such as twenty or thirty feet or of graphic symbols such as icons.

The display screen 12 can be of a fixed form so as to display only a single message when energized, or it may be of a type that will allow the display of a variety of messages provided to the display by the associated electronics. A single message display might constitute a transparent or translucent panel with the single message imprinted on the panel in opaque letters and suitable backlighting so that the message is visible when the backlight is energized. A controllable message display might constitute a liquid crystal display, projection display, matrix of controllable lights or light emitting diodes, or the like.

Figure 2:
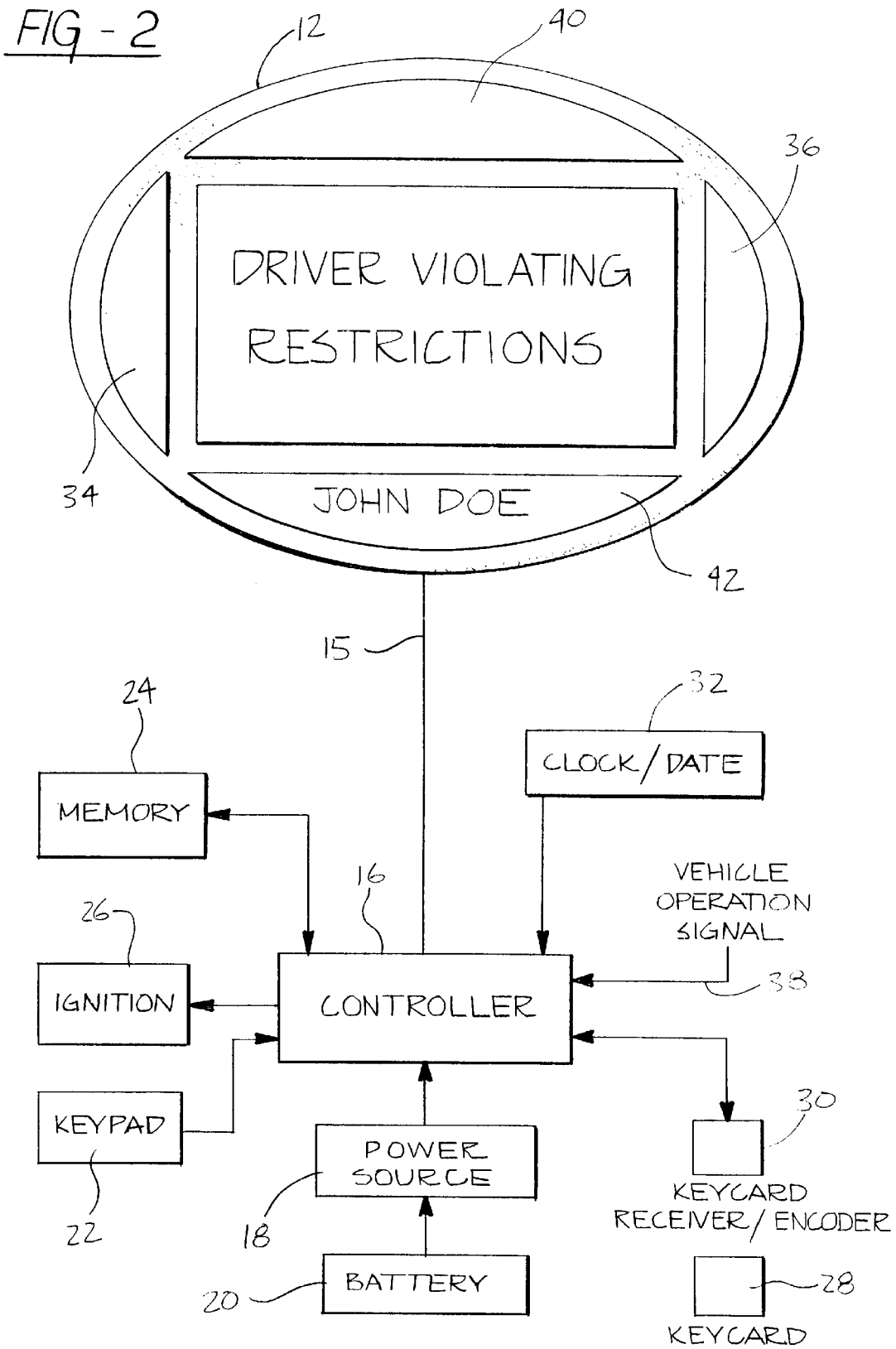
FIG. 2 is a schematic diagram of the components making up the system.

As illustrated in the schematic diagram of FIG. 2, the display 12 is controlled as to energization and/or the nature of the message by a signal on line 15 from a controller 16. The controller is preferably based upon a suitably programmed microprocessor. The controller receives energy from a power source 18 which is preferably powered by the battery 20 of the vehicle 10.

A keypad 22 or keyboard or the like is connected to the controller 16 to allow an operator to provide input signals. The computer program associated with the controller 16 preferably includes a security system so that inputs from the keypad 22 must be accompanied by a password or PIN number.

A solid state memory 24, preferably of a nonvolatile variety, such as flash memory, is connected to the controller 16 and may store messages to be shown on the display 12, as entered in on the keypad 22 such as restrictions on particular drivers licenses or authorizations or the like.

The controller 16 also has a connection to the vehicle ignition system 26 so that the vehicle cannot be started without receipt of an appropriate signal from the controller 16. In order to enable the ignition 26, an appropriately encoded keycard 28 having a coding in the form of a magnetic stripe, punch holes or a smart card chip must be inserted in a keycard receiver 30 which is connected to the controller.

Each driver of the vehicle possesses a different keycard 28. The keycard is preferably encoded only with the identification of the driver; however, in alternative embodiments of the invention, the keycard could be encoded with restrictions placed on the drivers license or authorization to use the vehicle 10, which would eliminate the need to enter such restrictions and limitations into the controller 16 via the keypad 22 and store them into memory 24.

In the embodiment of the invention in which only the identification of an authorized driver is encoded on the keycard 28, the authorizing person such as the owner of the vehicle must enter the identity of authorized drivers and any restriction on the drivers into the controller 16 using the keypad 22. This information is then stored in the memory 24 or in memory forming part of the microprocessor utilized with the controller. When a driver enters the vehicle he or she enters the keycard 28 into the keycard receiver 30. The controller receives the driver's identity from the keycard and compares it with a list of authorized drivers stored in the memory 24. If there is a match the controller sends a signal to the ignition 26 which allows the vehicle to be started in the normal manner.

The controller also accesses any stored limitations on the license or authorization of the driver from the memory 24. To the extent these are time of day or date limitations, the controller accesses information from a clock 32 to determine if the restrictions stored in the memory 24 are violated by the driver's immediate use of the vehicle. If they are, the controller provides an appropriate signal on line 14 to cause the display of a message such as "driver violating restrictions." When observers of the vehicle note this message they may take appropriate action, such as stopping the vehicle if the observer is a police officer or phoning the police. This arrangement allows normal use of the vehicle in emergency situations but advertises the fact that restrictions are being violated so that the driver may not regularly violate the restrictions without detection.

In the event that the display is a single message display, the signal on line 15 energizes the display 12 so as to display that message.

In an alternative embodiment of the invention the keycard 28 itself may be encoded with the restrictions on the licensing or authorization. For example, the police may themselves encode restrictions when a drivers license is limited by court order. Other restrictions may also be stored in the memory 24. Preferably the owner of the vehicle may encode keycards 28 with identities of authorized drivers and restrictions on the drivers authorization by placing the keycard 28 into the keycard receiver and sending signals to the controller 16 through the keypad 22 which will cause the keypad receiver 30 to encode the keycard 28.

The display 12 may be segmented in the manner illustrated in FIG. 2 to provide areas for the display of other information related to the operation of the vehicle for communication to drivers following the vehicle. For example, the display may have areas 34 and 36 for the display of left and right-hand turn signals. The controller receives the information from the vehicle on line 38. Similarly, the application of the brakes on the vehicle will cause the energization of a display area 40 at the top of the display 12. Other messages may be displayed in the area 42 such as the identity of the driver of the vehicle. The display 12 may also exhibit signals indicating whether the seat belt of the driver is engaged, the speed of the vehicle or other messages.

The keycard 28 may also function as a key for the door lock, trunk and ignition. The card could also serve as an identification card which could be given to police officers or store clerks. It could contain the name, address, and age of the owner, as well as a picture. In addition, information typically recorded on a driver's license could be included in the card. When an individual purchases a new car, the dealer could create identification cards for all prospective drivers. When a used car is sold, the seller and buyer could have cards made at a dealer or key shop, much like spare keys are produced today.

Figure 3:
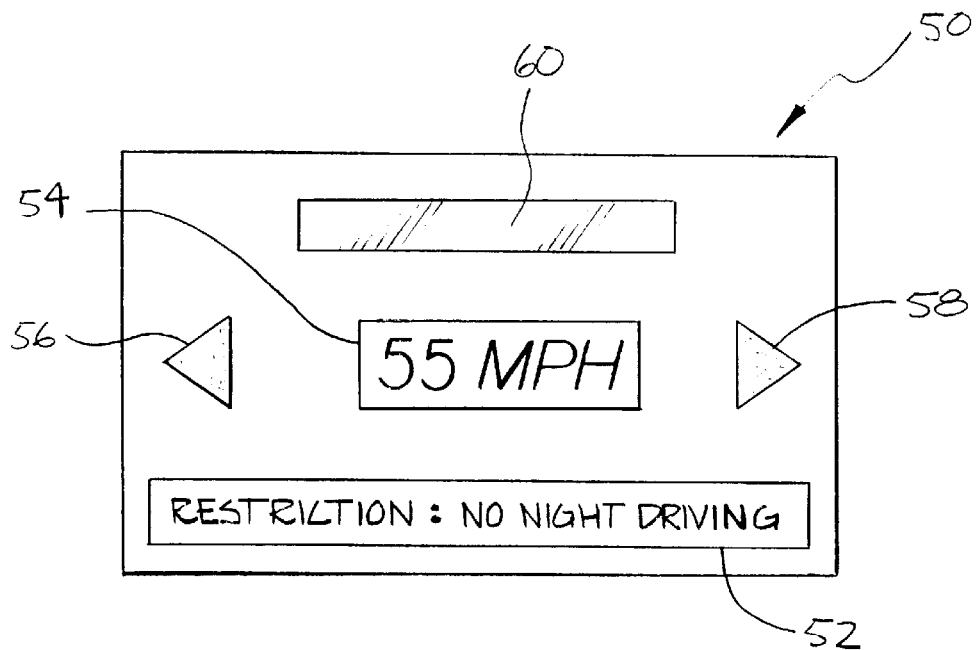
FIG. 3 is an alternative message carried on the display of the system of the present invention.

An alternative embodiment of display, designated by the numeral 50, is illustrated in FIG. 3. One section of the display, 52, displays any restrictions placed on the license of the driver driving the vehicle. For example, the driver may not be permitted to drive at night and that restriction could be displayed in the area 52. Similarly, the driver may not be allowed to drive before a particular date, such as Nov. 1, 1998 and that restriction could be displayed.

The instantaneous speed of the vehicle is displayed in the area 54 through a connection to the vehicle's speedometer and other appropriate sensor. Left and right turn indicators are designated by sections 56 and 58 respectively, and section 60 serves as a high level stop lamp. In this way, the function of the system in exhibiting driving restrictions to viewers can be coupled with safety information related to other aspects of operation of the vehicle.

Having described the various embodiments of the present invention with reference to the accompanying figures, it will be appreciated that various changes and modifications can be made without departing from the scope or spirit of the invention.

I claim:

1. A driver control display system for a vehicle, said system comprising:

a means for identifying a driver of the vehicle;

a display supported by said vehicle for selectively displaying a message that is viewable from outside the vehicle; and a controller in communication with said driver identifying means and said display, said controller including means for determining if the identified driver is violating a restriction, said controller causing said display to display the message when the identified driver is violating the restriction.

2. The driver control display system of claim 1 wherein the controller comprises means for storing information relating to restrictions for specified drivers and the system further includes means for entering information into the controller.

3. The driver control display system of claim 2 wherein the information stored in the storing means includes end dates of restrictions and the system includes a calendar clock providing signals for the controller to allow the controller to determine whether the restriction is in force at any particular time.

4. The driver control display system of claim 1 wherein the display supported by the vehicle is supported on the roof of the vehicle.

5. The driver control display system of claim 1 wherein the message viewable from outside of the vehicle relates to whether the vehicle is being driven by a driver who is violating restrictions.

* * * * *